United States Patent
Yi et al.

(10) Patent No.: US 11,277,294 B2
(45) Date of Patent: Mar. 15, 2022

(54) METHOD AND APPARATUS FOR SUPPORTING BANDWIDTH PART SWITCHING IN WIRELESS COMMUNICATION SYSTEM

(71) Applicant: LG Electronics Inc., Seoul (KR)

(72) Inventors: Yunjung Yi, Seoul (KR); Huayue Song, Seoul (KR); Daesung Hwang, Seoul (KR); Inkwon Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 47 days.

(21) Appl. No.: 16/626,440

(22) PCT Filed: Jul. 12, 2018

(86) PCT No.: PCT/KR2018/007900
§ 371 (c)(1),
(2) Date: Dec. 24, 2019

(87) PCT Pub. No.: WO2019/013564
PCT Pub. Date: Jan. 17, 2019

(65) Prior Publication Data
US 2020/0136878 A1    Apr. 30, 2020

Related U.S. Application Data

(60) Provisional application No. 62/531,865, filed on Jul. 12, 2017.

(51) Int. Cl.
*H04W 24/10*    (2009.01)
*H04L 27/26*    (2006.01)
(Continued)

(52) U.S. Cl.
CPC .......... *H04L 27/2657* (2013.01); *H04L 5/001* (2013.01); *H04L 5/0048* (2013.01);
(Continued)

(58) Field of Classification Search
CPC ... H04L 27/2657; H04L 5/001; H04L 5/0048; H04L 5/0053; H04L 27/2613;
(Continued)

(56) References Cited

U.S. PATENT DOCUMENTS

2016/0302230 A1    10/2016  Novlan et al.
2018/0310300 A1*   10/2018  Lin ........................ H04L 5/0091
(Continued)

OTHER PUBLICATIONS

Huawei, HiSilicon, "Overview of wider bandwidth operations," R1-1709972, 3GPP TSG RAN WG1 NR Ad Hoc Meeting, Qingdao, China, Jun. 17, 2017, 11 pages.
(Continued)

*Primary Examiner* — Jae Y Lee
*Assistant Examiner* — Aixa A Guadalupe Cruz
(74) *Attorney, Agent, or Firm* — Fish & Richardson P.C.

(57) ABSTRACT

A method and apparatus for performing measurement based on synchronization signal (SS) blocks in a wireless communication system is provided. A user equipment (UE) which supports a new radio access technology (NR) receives a SS block measurement timing configuration (SMTC) from a network, and performs measurement based on the SS blocks in a duration which is determined based on the SMTC. The SS blocks are included in an active bandwidth part (BWP).

15 Claims, 11 Drawing Sheets

(51) Int. Cl.
  *H04L 5/00* (2006.01)
  *H04W 72/04* (2009.01)
(52) U.S. Cl.
  CPC ........ *H04L 5/0053* (2013.01); *H04L 27/2613* (2013.01); *H04L 27/2692* (2013.01); *H04W 72/0453* (2013.01)
(58) Field of Classification Search
  CPC ......... H04L 27/2692; H04L 27/26025; H04W 72/0453; H04W 56/00; H04W 24/10
  See application file for complete search history.

(56) References Cited

U.S. PATENT DOCUMENTS

| | | | | |
|---|---|---|---|---|
| 2018/0324678 A1* | 11/2018 | Chen | ...................... | H04W 24/10 |
| 2018/0324732 A1* | 11/2018 | Park | ...................... | H04W 72/12 |
| 2019/0021119 A1* | 1/2019 | Ng | ........................ | H04W 48/10 |
| 2020/0288337 A1* | 9/2020 | Callender | ............. | H04W 24/10 |
| 2020/0344761 A1* | 10/2020 | Amuru | .................. | H04L 5/0007 |

OTHER PUBLICATIONS

Vivo, "SS block transmissions and RRM measurement in wideband CC," R1-1710374, 3GPP TSG RAN WG1 NR Ad-Hoc Meeting #2, Qingdao, P.R. China, Jun. 17, 2017, 6 pages.

Samsung, "Wider Bandwidth Operations," R1-1710761, 3GPP TSG RAN WG1 NR Ad-Hoc#2, Qingdao, P.R. China, Jun. 16, 2017, 10 pages.

NTT Docomo, [RAN WG1], "[Draft] LS on NR initial access and mobility," R1-1711985, 3GPP TSG RAN WG1 NR Ad-Hoc#2, Qingdao, P.R. China, Jul. 1, 2017, 8 pages.

* cited by examiner

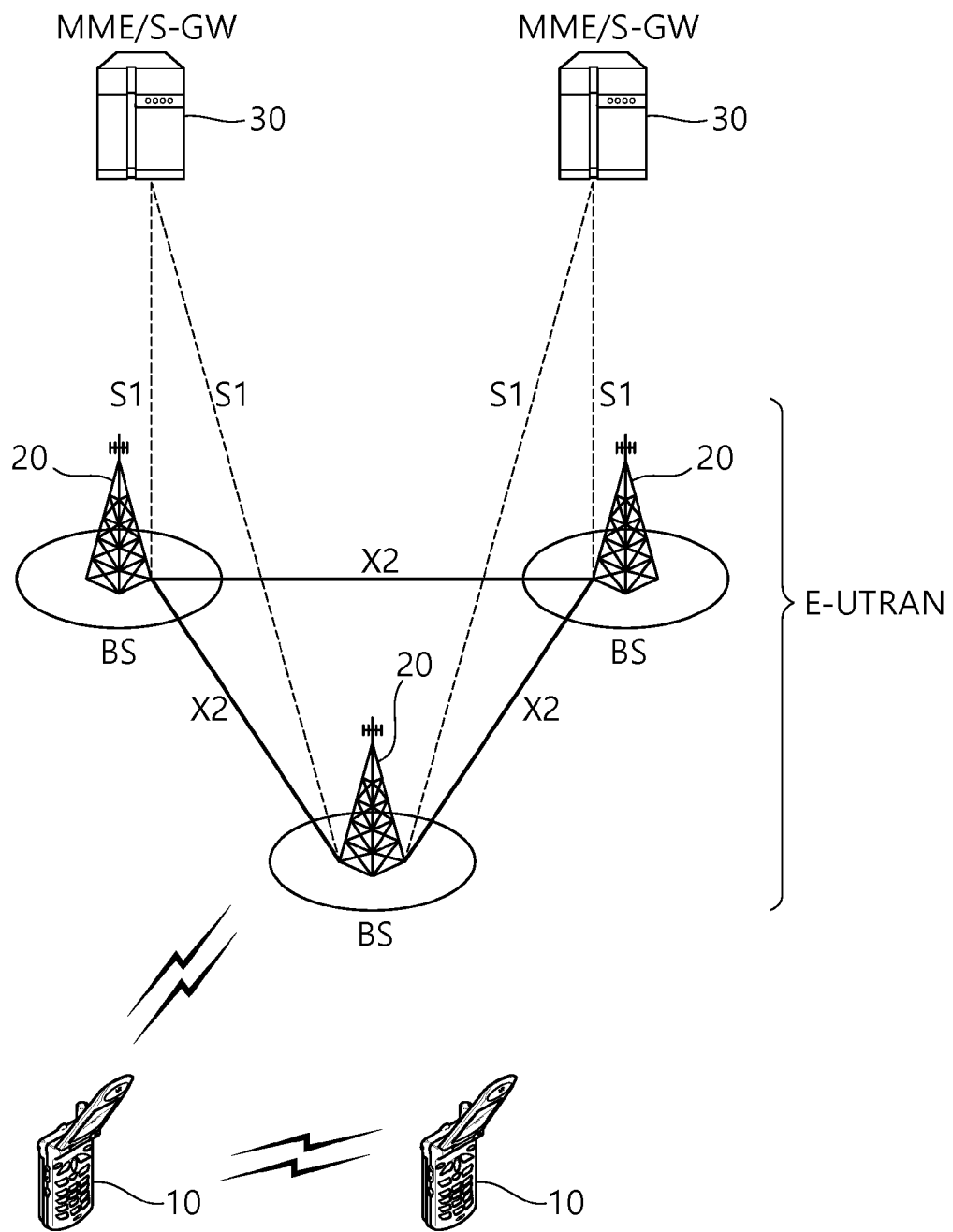
[Fig. 1]

[Fig. 2]
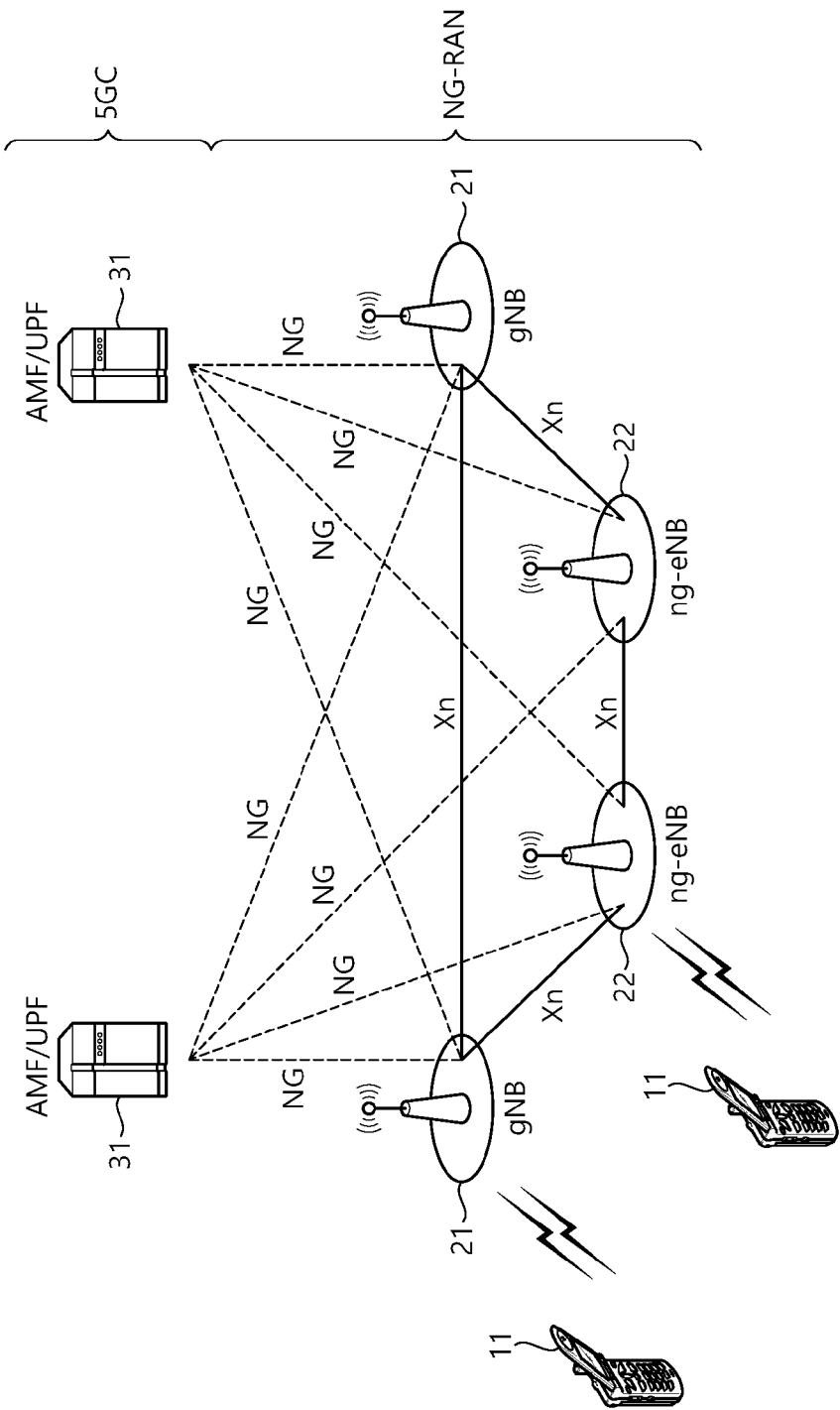

[Fig. 3]
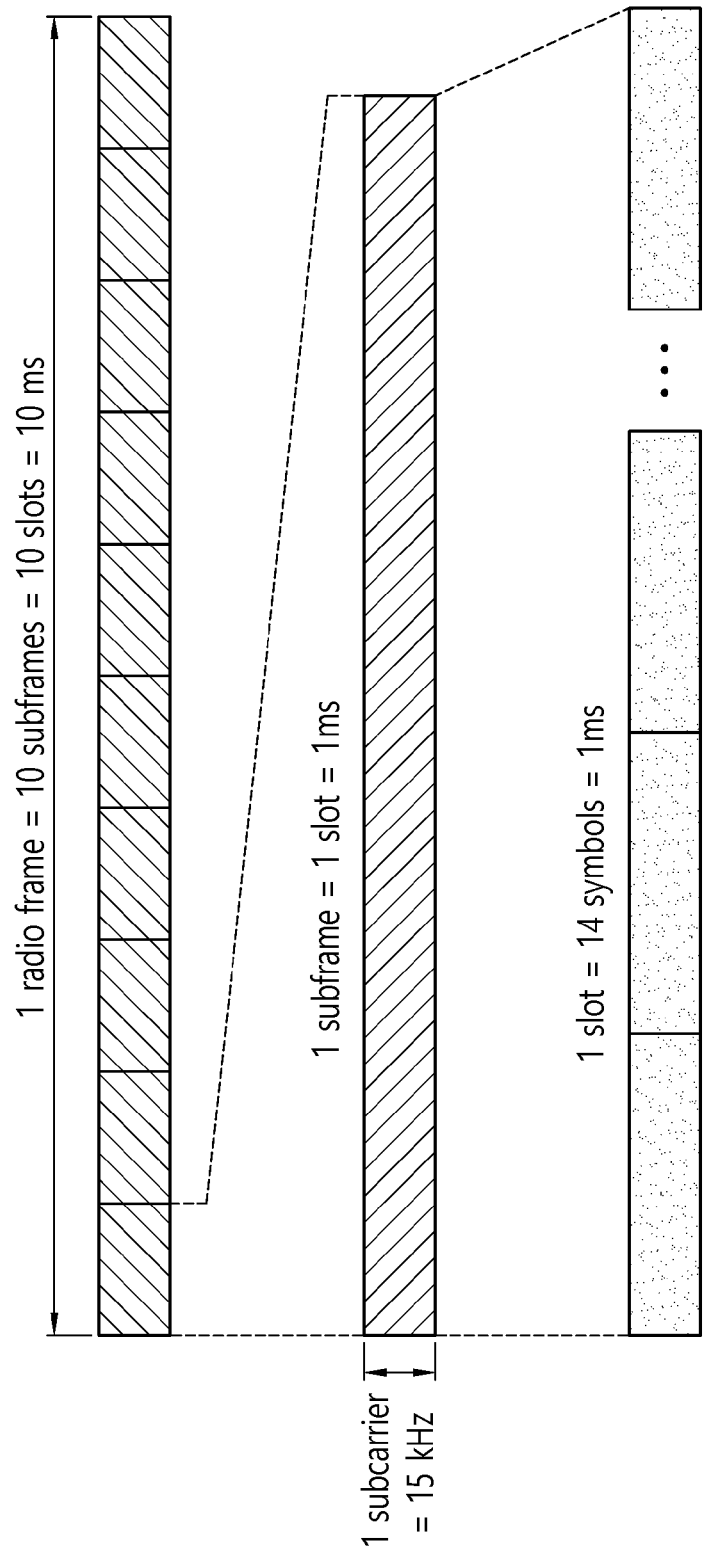

[Fig. 4]
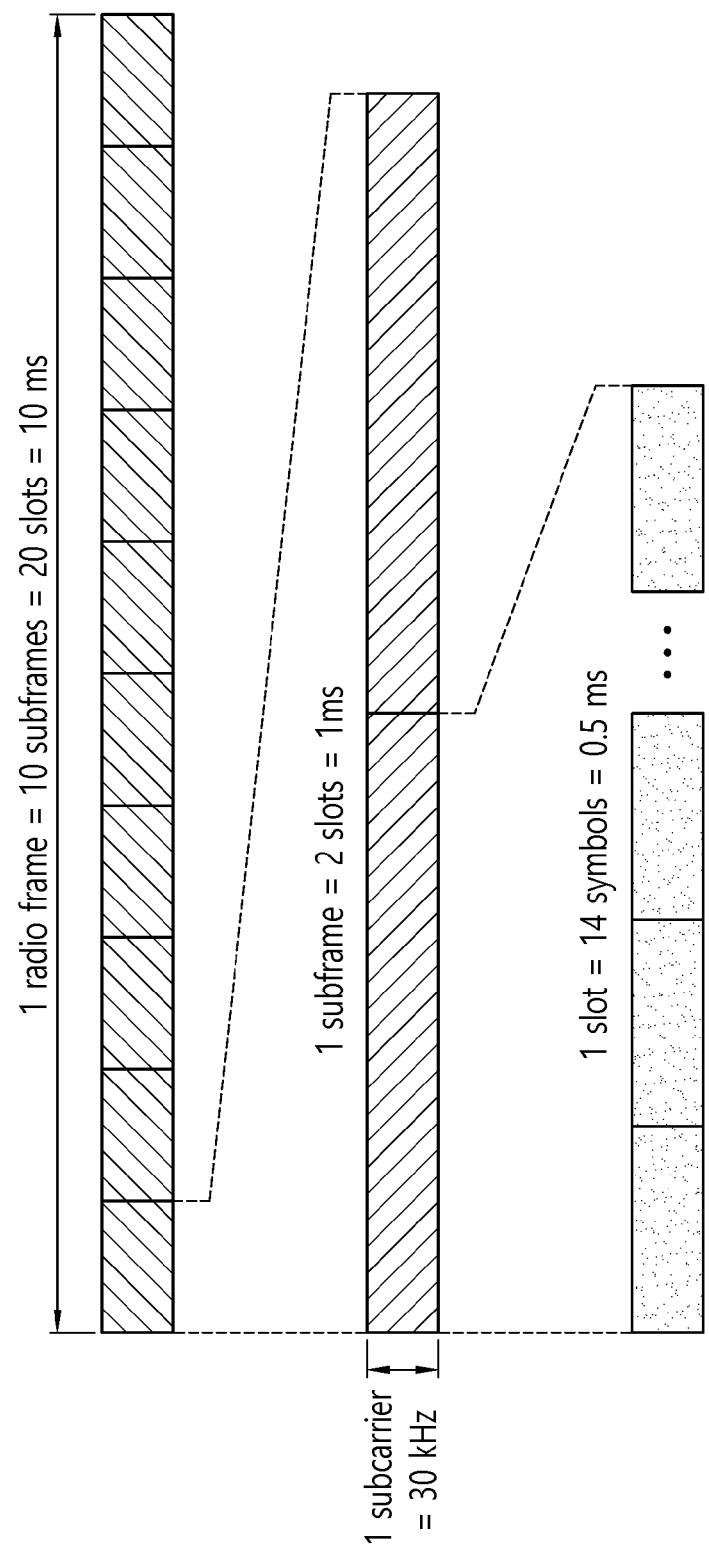

[Fig. 5]
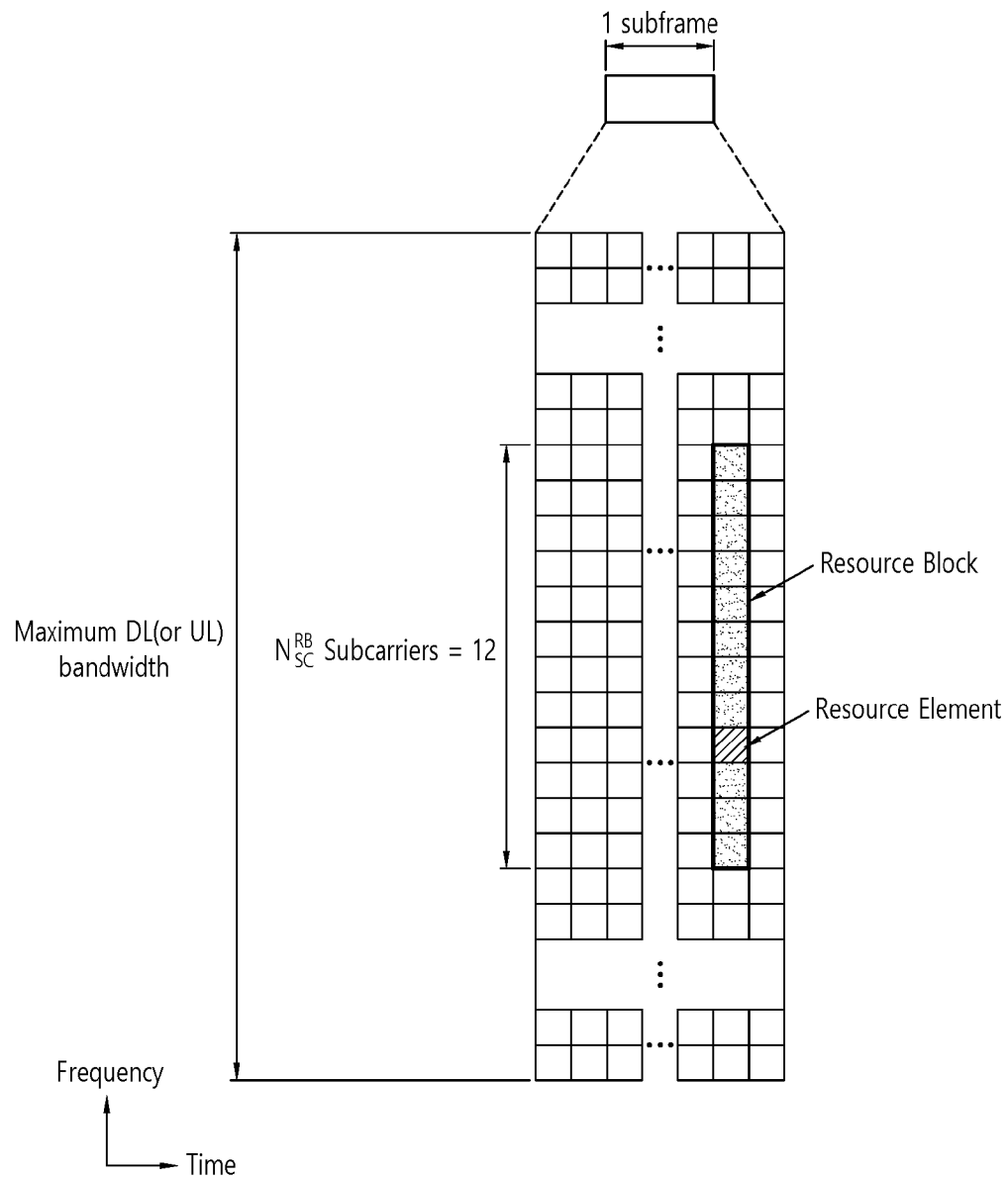

[Fig. 6]
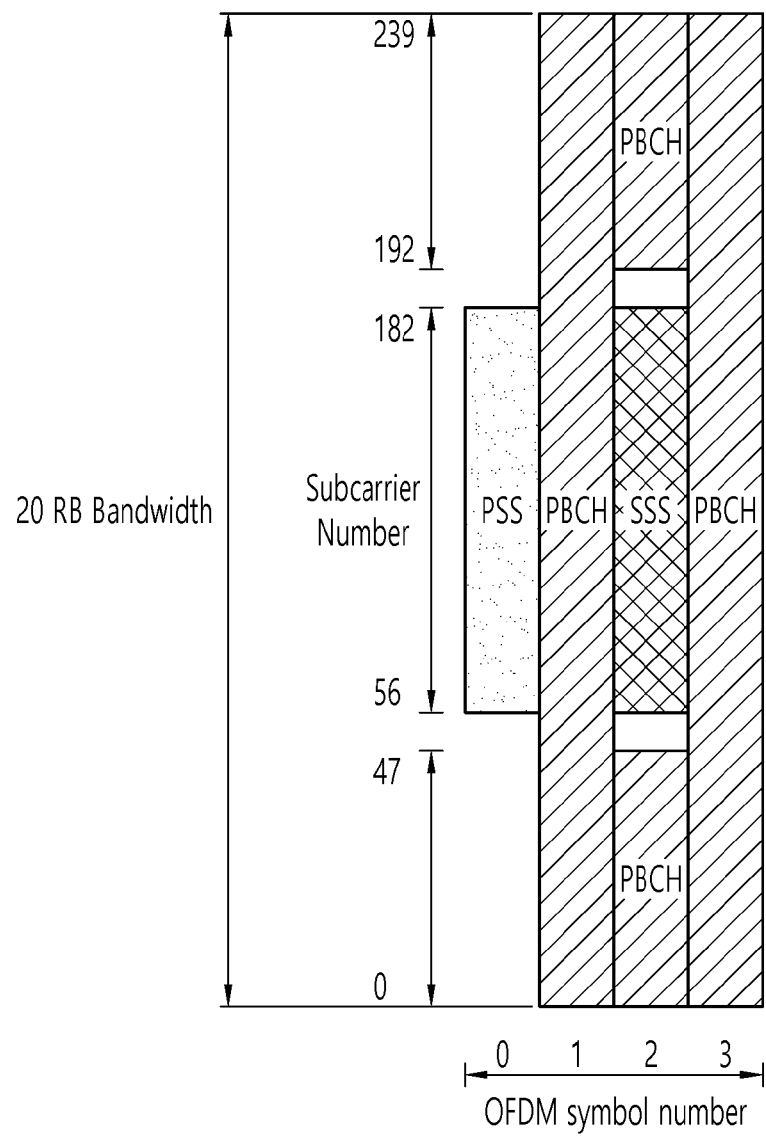

[Fig. 7]
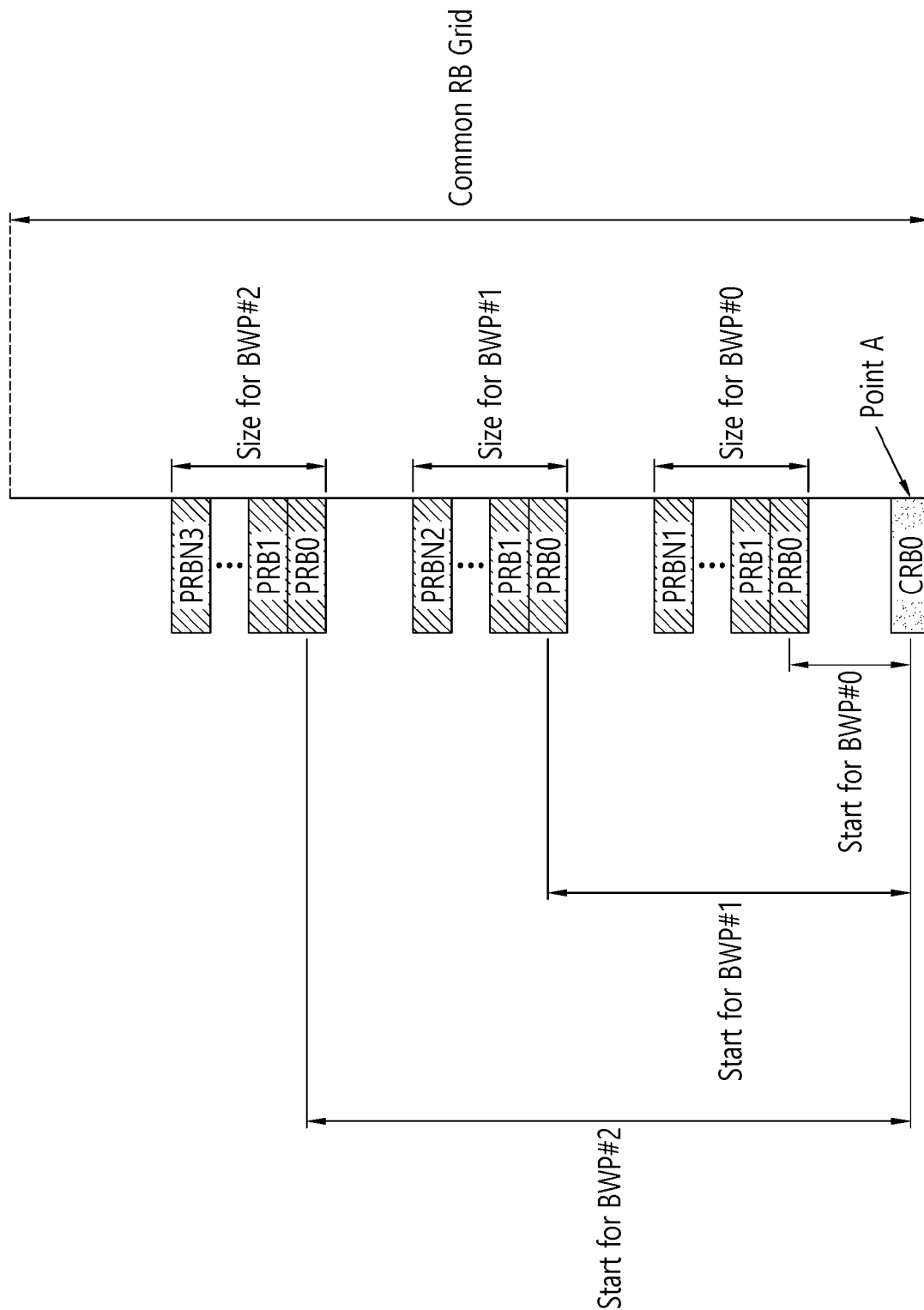

[Fig. 8]
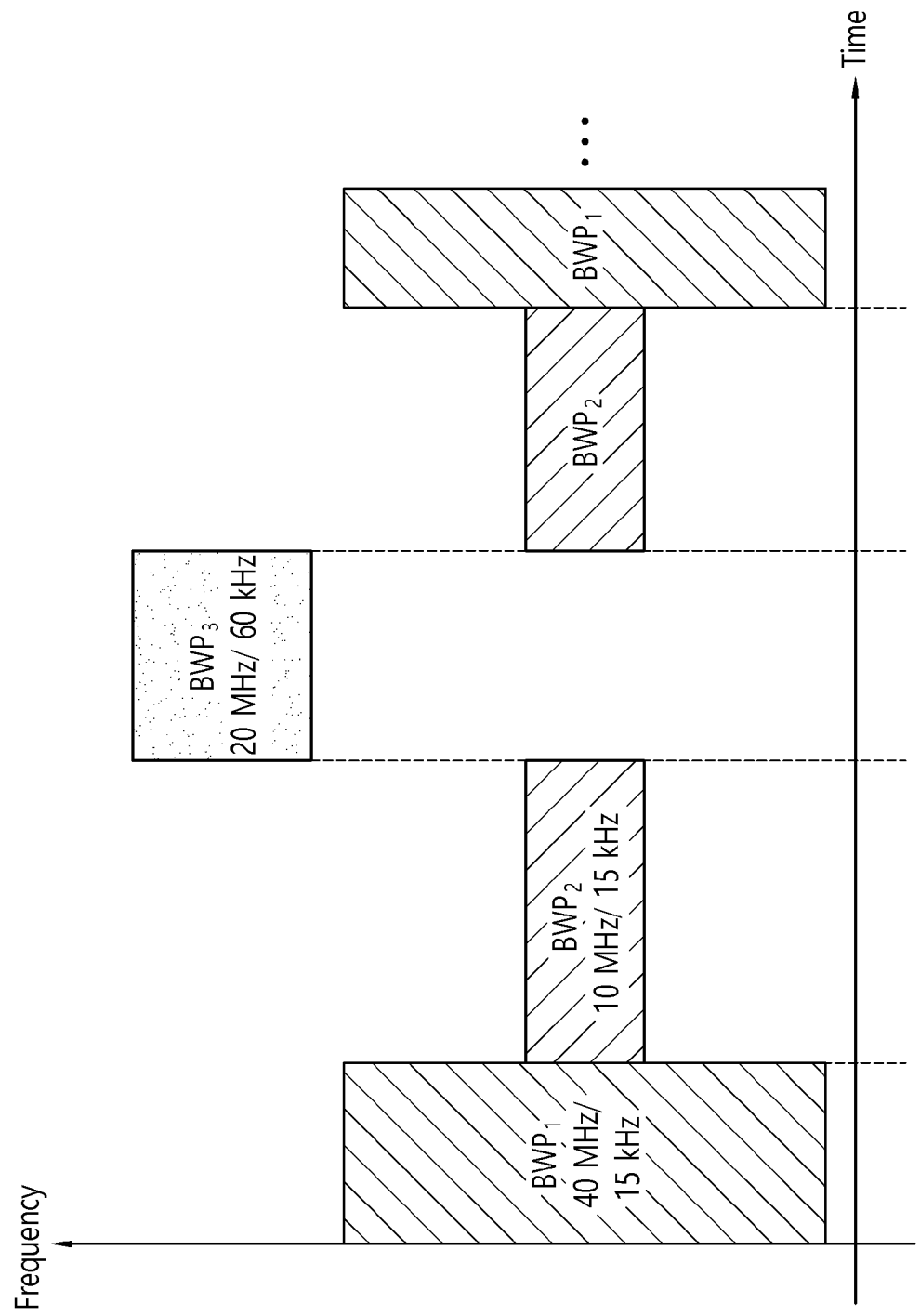

[Fig. 9]
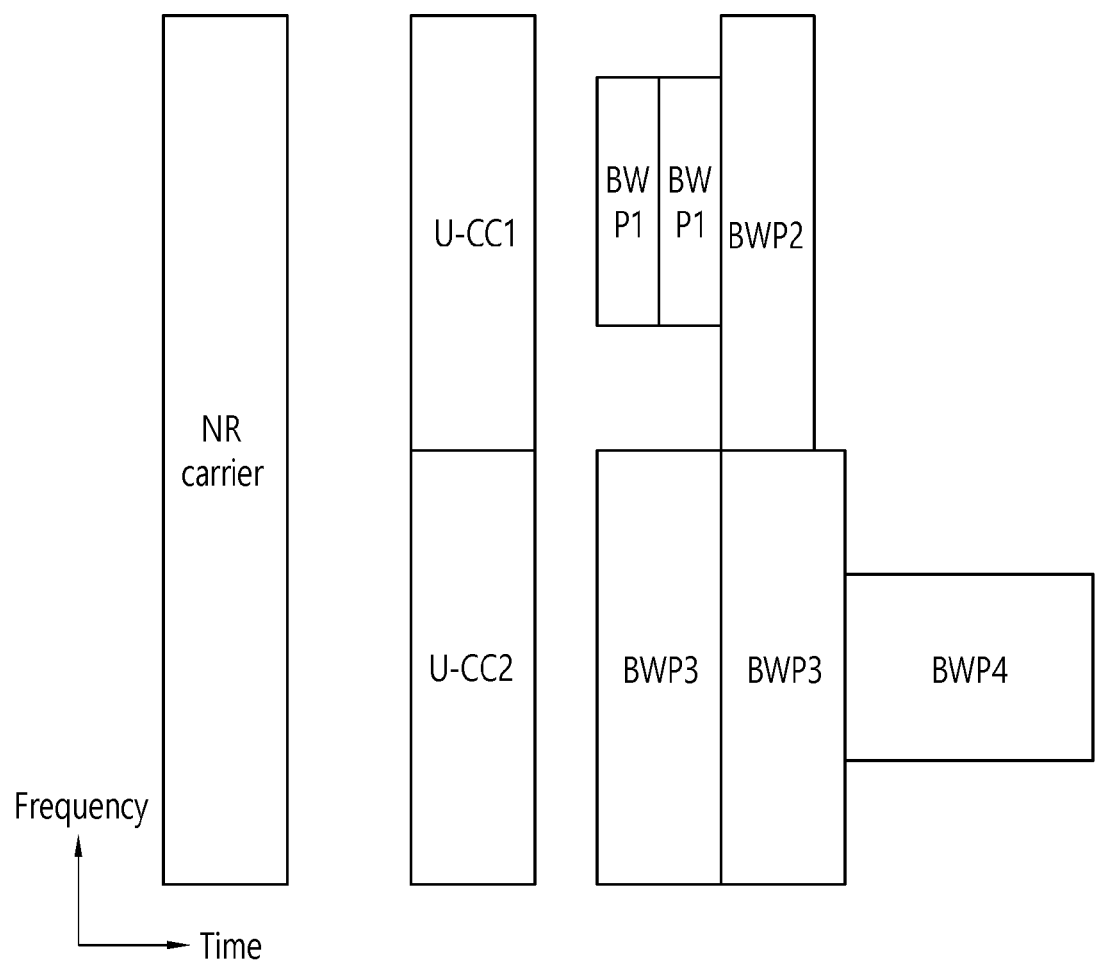

[Fig. 10]
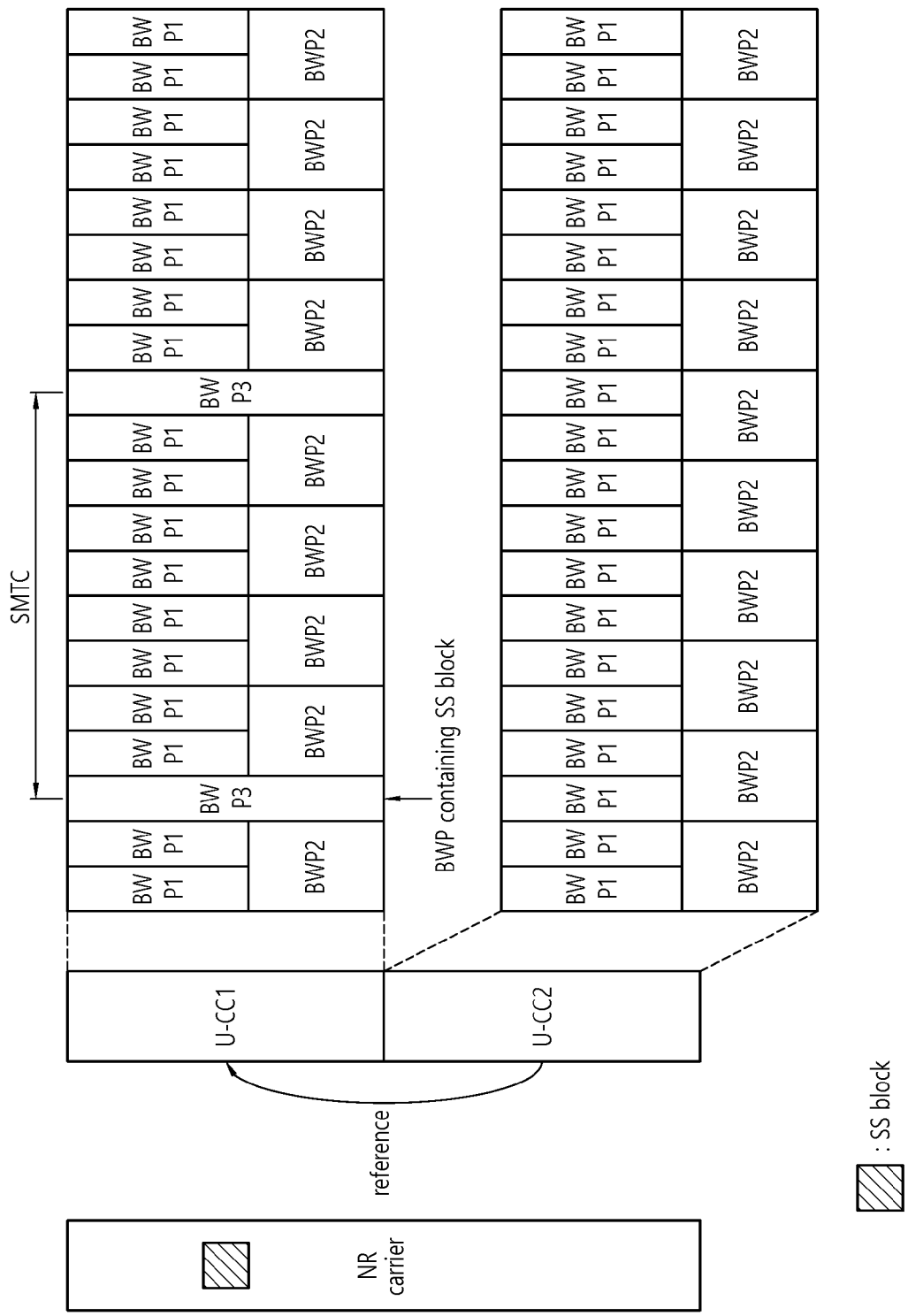

[Fig. 11]
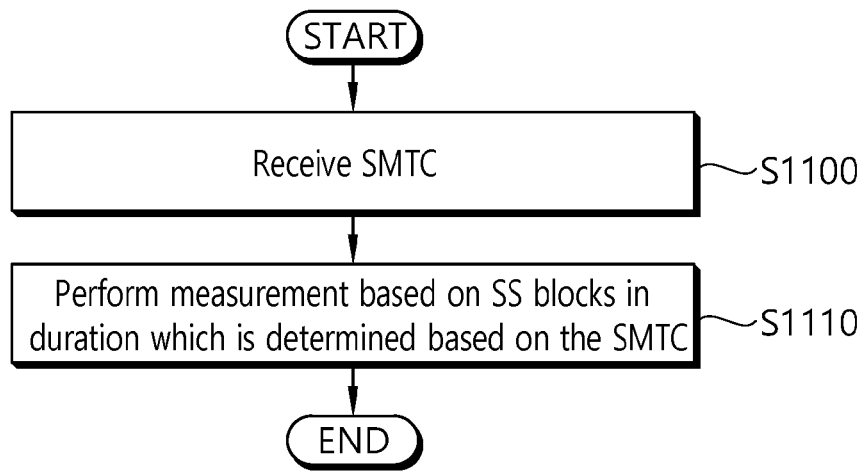
[Fig. 12]
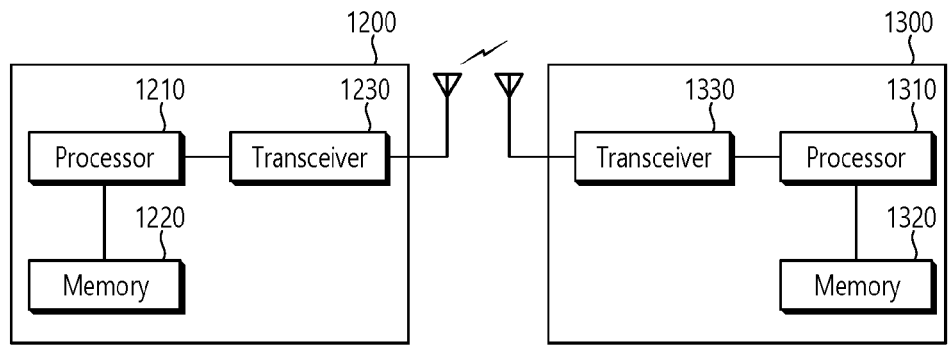

METHOD AND APPARATUS FOR SUPPORTING BANDWIDTH PART SWITCHING IN WIRELESS COMMUNICATION SYSTEM

CROSS-REFERENCE TO RELATED APPLICATIONS

This application is a National Stage application under 35 U.S.C. § 371 of International Application No. PCT/KR2018/007900, filed on Jul. 12, 2018, which claims the benefit of U.S. Provisional Application No. 62/531,865, filed on Jul. 12, 2017. The disclosures of the prior applications are incorporated by reference in their entirety.

TECHNICAL FIELD

The present invention relates to wireless communications, and more particularly, to a method and apparatus for supporting a bandwidth part (BWP) switching in a new radio access technology (NR) system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In NR, a concept of bandwidth part (BWP) and bandwidth adaptation is supported. With bandwidth adaptation, the receive/transmit bandwidth of a user equipment (UE) need not be as large as the bandwidth of a cell and can be adjusted. The width of the receive/transmit bandwidth can be ordered to change (e.g. to shrink during period of low activity to save power). The location of the receive/transmit bandwidth can move in the frequency domain (e.g. to increase scheduling flexibility). The subcarrier spacing of the receive/transmit bandwidth can be ordered to change (e.g. to allow different services). A subset of the total cell bandwidth of a cell is referred to as a BWP and bandwidth adaptation is achieved by configuring the UE with BWP(s) and telling the UE which of the configured BWPs is currently the active one.

DISCLOSURE OF INVENTION

Technical Problem

Currently, operations regarding BWPs and bandwidth adaptation has not been clearly defined. Specifically, when the UE is configured to measure SS blocks, and BWP switching is performed, there may be no SS blocks in a switched BWP.

Solution to Problem

In an aspect, a method for performing measurement based on synchronization signal (SS) blocks by a user equipment (UE) in a wireless communication system is provided. The method includes receiving a SS block measurement timing configuration (SMTC) from a network, and performing measurement based on the SS blocks in a duration which is determined based on the SMTC. The SS blocks are included in an active bandwidth part (BWP).

In another aspect, a user equipment (UE) in a wireless communication system is provided. The UE includes a memory, a transceiver, and a processor, coupled to the memory and the transceiver, that controls the transceiver to receive a SS block measurement timing configuration (SMTC) from a network, and performs measurement based on synchronization signal (SS) blocks in a duration which is determined based on the SMTC. The SS blocks are included in an active bandwidth part (BWP).

Advantageous Effects of Invention

The UE can reliably perform measurements in a switched BWP. Specifically, when the UE is configured to measure SS blocks, it can be avoided that there is no SS blocks in an active BWP.

BRIEF DESCRIPTION OF DRAWINGS

FIG. 1 shows an example of a wireless communication system to which technical features of the present invention can be applied.

FIG. 2 shows another example of a wireless communication system to which technical features of the present invention can be applied.

FIG. 3 shows an example of a frame structure to which technical features of the present invention can be applied.

FIG. 4 shows another example of a frame structure to which technical features of the present invention can be applied.

FIG. 5 shows an example of a resource grid to which technical features of the present invention can be applied.

FIG. 6 shows an example of a synchronization channel to which technical features of the present invention can be applied.

FIG. 7 shows an example of a frequency allocation scheme to which technical features of the present invention can be applied.

FIG. 8 shows an example of multiple BWPs to which technical features of the present invention can be applied.

FIG. 9 shows an example of relating between a carrier, a U-CC and a BWP according to an embodiment of the present invention.

FIG. 10 shows an example of active BWP for SS block based measurement according to an embodiment of the present invention.

FIG. 11 shows a method for performing measurement based on SS blocks by a UE according to an embodiment of the present invention.

FIG. 12 shows a wireless communication system to implement an embodiment of the present invention.

MODE FOR THE INVENTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| μ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index μ. However, subcarrier spacings shown in Table 1 are merely exemplary, and specific subcarrier spacings may be changed. Therefore, each subcarrier spacing (e.g. μ= 0,1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to μ=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

FIG. 3 shows an example of a frame structure to which technical features of the present invention can be applied. In FIG. 3, a subcarrier spacing is 15 kHz, which corresponds to μ=0.

FIG. 4 shows another example of a frame structure to which technical features of the present invention can be applied. In FIG. 4, a subcarrier spacing is 30 kHz, which corresponds to μ1.

Table 3 shows an example of a number of OFDM symbols per slot, slots per radio frame, and slots per subframe for extended CP.

TABLE 3

| μ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| For-mat | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | X | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| ... | | | | | | | | | | | | | | |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1).

Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Hereinafter, various embodiments of the present invention is described. The present invention proposes mechanisms to change BWPs, particularly, between different BWPs with bandwidths and frequency location, and BWPs with different numerologies.

BWP, i.e. a UE specific bandwidth, may be configured to a UE to support the following use cases.

Narrowband UEs in a wideband carrier

Bandwidth adaptation to allow UE power savings

When a UE is equipped with multiple radio frequencies (RFs) or the network may have dis-contiguous bandwidths, the network may configure multiple carriers to a UE in one carrier from the network perspective. In the description below, the multiple carries in one carrier from the network perspective is called as UE-specific component carriers ("U-CC"). In terms of the U-CC, the following properties may be considered.

The bandwidth of the U-CC, if known, may not change dynamically. The UE RF requirement may be based on the U-CC or the supported bandwidth of each U-CC. Each U-CC may be defined as a set of {start frequency, end frequency, a numerology for the given frequency} for the supported numerology(s). Depending on guard band requirement, the start frequency and end frequency for the given numerology may be different per numerology.

Per each U-CC, it may be assumed that there is a SS block within the U-CC. Or, it may be assumed that a UE is configured with reference SS block where the U-CC can refer. If a reference SS block is used, this U-CC may be configured to a UE as a secondary cell (SCell) only.

Unless explicitly configured, measurement may be done per U-CC.

The U-CC may be configured by higher layer signaling, and may be activated/deactivated via media access control (MAC) control element (CE).

Only one PUCCH may be transmitted per U-CC or per U-CC group at a given time. When there are multiple active BWPs or multiple BWPs, aggregated uplink control information (UCI) may be supported.

The number of blind decoding may be defined per U-CC, rather than per BWP. Regardless of active BWPs and the configured number of CORESETs, it may not expected that the total number of blind decodings exceeds UE capability.

In each U-CC, a UE may be configured with one or more of BWPs. The one or more BPWs may be activated simultaneously. In terms of the BWP, the following properties may be considered.

The BWP may be configured to a UE via UE-specific higher layer signaling.

For radio resource management (RRM) measurement, even if a UE is configured with multiple active BWPs, RRM measurement may be done once per U-CC. In other words, measurement configuration and measurement itself may be done per U-CC regardless of the number of active BWPs per each U-CC.

Each BWP is associated with single numerology.

Channel state information (CSI) measurement may be basically performed within the BWP. However, Aperiodic CSI reporting for another BWP (different from active BWP) may be supported. The aperiodic CSI reporting may need to configure timing where measurement reference signal (RS) is transmitted (e.g. next slot or a few symbols later) and/or timing where measurement reporting needs to be transmitted.

FIG. 9 shows an example of relating between a carrier, a U-CC and a BWP according to an embodiment of the present invention. Referring to FIG. 9, NR carrier, from a network perspective, includes U-CC1 and U-CC2, from a UE perspective. In U-CC1, BWP1 and BWP2 may be configured. In U-CC2, BWP3 and BWP4 may be configured. At least one BWP may be activated simultaneously among multiple BWPs per each U-CC.

The present invention discusses an overall procedure how U-CC and BWP are configured, and activated/deactivated. Particularly, the present invention discusses how to handle control for both DL and UL when there are multiple active BWPs.

1. Initial configuration

A U-CC which is initially connected may be considered as UE-specific primary CC (U-PCC). A UE-specific secondary CC (U-SCC) may be configured to a UE according to carrier-aggregation framework. That is, the U-SCC may be configured via RRC, and activated/deactivate via MAC CE.

Regarding U-PCC, the following features may be considered. UE's bandwidth may be determined by SS block when a UE reads SS block. Alternatively, UE's bandwidth may be determined by both SS block and RMSI when a UE reads RMSI or when UE's active BWP is an initial DL BWP. In this case, the UE's bandwidth may be sufficiently large to include both SS block and RMSI CORESET. Alternatively, UE's bandwidth may be changed if additional COREST and bandwidth for common data for random access procedure can be configured. If the UE goes to RRC_IDLE, bandwidth for paging & SS block may determine the UE's monitoring bandwidth. UE's default bandwidth for USS monitoring may be configured as bandwidth for monitoring Msg4 for both CORESET and data.

A UE may be configured with one or more of BWPs via RRC configuration after receiving Msg4. One of BWP may be configured with active BWP. The BWP having the lowest index may be configured with active BWP. Or, active BWP may be explicitly indicated. If multiple BWPs are configured, other BWPs except the current active BWP may be considered as additional BWPs. The other BWPs may be activated by switching active BWP. If a UE can support multiple numerologies simultaneously, a UE may report its capability regarding simultaneous support of multiple numerologies via Msg3. After that, a UE may be configured with multiple active BWPs. In this case, the BWP having the lowest index per each numerology may be configured with active BWP. Or, active BWP may be explicitly indicated.

When UE's BWP does not include SS block where the UE has initially accessed, the following approaches can be considered.

A UE may be configured with another SS block, and a UE may be required to monitor the configured SS block assuming that the same RMSI contents are used between the SS block that the UE has initially accessed and the configured SS block.

A UE may perform intra-cell handover to switch SS block. That is, before a UE is configured with BWP which does not contain SS block, the intra-cell handover may be triggered. The intra-cell hand-over may be automatically triggered if a UE is configured with active BWP which does not contain SS block.

Unless handled by the intra-cell handover, a UE may not be expected to be configured with a BWP which does not contain SS block. This may be expected at least when a UE is not configured with a measurement gap to perform SS block based measurement and/or a UE is configured with SS block measurement timing configuration (SMTC) for the serving cell or serving cell frequency. Alternatively, a UE may be configured with measurement gap or interruption gap, and the UE can retune to SS block for measurement in the measurement gap or interruption gap.

At least one BWP may include SS block, and a UE may expect to retune or to be activated with the BWP containing SS block whenever the measurement is necessary. For example, in every SS block or every period configured by SMTC, a UE may assume that BWP(s) containing SS block is activated. This may be ensured by the network via dynamic BWP switching. Or, a UE may autonomously switch to the BWP containing SS block. In other words, a UE may not be expected to perform SS block based measurement for a serving cell, unless currently active BWP in a SMTC period contains SS block or at least adjacent to SS block (e.g. initial DL BWP next to SS block by multiplexing pattern 2 or 3).

FIG. 10 shows an example of active BWP for SS block based measurement according to an embodiment of the present invention. Referring to FIG. 10, an active BWP contains SS block at least for SMTC periodicity. When BWP(s) containing SS blocks are activated according to SMTC configurations, the duration may be determined based on the active SS blocks or may be configured by higher layer signaling.

In terms of RRM measurement, a UE may be configured with RRM measurement bandwidth/frequency information. The RRM measurement bandwidth/frequency may be separately managed from BWP configurations. In order not to incur any interruption in terms of data scheduling, at least one BWP configuration may include measurement configuration. In RRM measurement configuration based on CSI-RS or based on SS block, a UE may be configured with BWP index which can be active at measurement timing.

The measurement duration or the duration where the associated BWP(s) are activate may be determined implicitly by the size of measurement RS transmission (e.g. the duration of CSI-RS transmission). Or, the measurement duration or the duration where the associated BWP(s) are activate may be determined may be defined as a slot assuming that duration of measurement RS transmission is less than or equal to the slot size. Or, the measurement duration or the duration where the associated BWP(s) are activate may be configured by higher layer signaling.

If a UE is not configured with associated active BWP(s), a UE may not be required to monitor control/data or transmit control/data during the measurement (in terms of transmission, the capability may be determined only in case of inter-frequency measurement outside of the carrier). The measurement duration may be determined similarly as to determine the duration of active BWP(s). In terms of necessary gap between measurements for any retuning/BW adaptation, a UE may create the gap by not receiving/transmitting any data between the measurements. Explicit measurement gaps may be configured or explicit active duration of the BWP containing RRM measurement bandwidth/frequency may also be configured.

In summary, the following features may be considered for RRM (and possibly for beam management measurement and CSI measurement, respectively).

A UE may be configured with measurement bandwidth/frequency, and the measurement may occur for intra-frequency and/or inter-frequency.

A UE may be configured with at least one BWP which can be activated when measurement needs to be occurred.

At measurement timing, a UE may be activated with the associated BWP(s).

The timing of activation for such BWP(s) may include at least necessary retuning gap, measurement period, and retuning gap for another BWP.

During the measurement, a UE may expect to receive control signal in the active BWPs. The control signal may be self-carrier scheduled or cross-carrier scheduled.

The UE may not be requested to change the BWP during the measurement period.

After the measurement, a UE may fallback to the active BWP(s) which were active before the measurement, unless the UE has received BWP switching during the measurement.

Particularly when a UE is in RRC_IDLE or discontinuous reception (DRX), autonomous UE BWP adaptation may occur depending on the measurement configurations and CORESET and data bandwidth configurations.

In terms of PUCCH transmission for Msg4, default PUCCH resource may be configured. The default PUCCH resource may be same as the bandwidth where Msg3 has been transmitted or BWP assumed for Msg3 transmission. UL default BWP may be same as the bandwidth/frequency configuration where Msg3 is scheduled. The UL default BWP may be configured as follows.

UL default BWP may be same as DL default BWP (i.e. DL BWP for Msg4), at least for the case where UL numerology is same as DL numerology. In case of FDD, a fixed duplexing gap between DL and UL may be used to determine default UL BWP frequency location, and the same bandwidth may be used for UL at least for the same numerology case.

If DL and UL use different numerology, the same bandwidth and frequency location corresponding to DL default BWP may be used for UL default BWP. Depending on the numerology, different number of PRBs may be used. Alternatively, the same center frequency corresponding to DL default BWP may be used for UL default BWP. The bandwidth may be linearly scaled to have the same number of PRBs to DL default BWP.

Even if UL default BWP corresponds to DL default BWP, after Msg4, UL BWP may be configured similar to DL BWP, and one or more of active BWPs may be indicated implicitly or explicitly.

The configuration for UL default BWP may be explicitly indicated in physical random access channel (PRACH) configuration or random access response (RAR).

Upon determining the UL default BWP, the PUCCH may be transmitted in the UL default BWP. If the number of the default BWP is only one, PUCCH resource may be relatively configured with the bandwidth of the UL default BWP. Assuming that PUCCH resources are placed near the edge of the UL default BWP, relative offset from the edge may be used regardless of BWP change. The location of PUCCH resource may be explicitly configured per each BWP including the UL default BWP. For the UL default BWP, the configuration may be given in system information (SI) or may be pre-determined by the specification.

If the number of UL default BWPs is more than one, a single UL default BWP may be selected for PUCCH transmission. The numerology or UL default BWP used for PUCCH transmission may be explicitly or implicitly indicated as follows.

The BWP having the lowest BWP index may be used for PUCCH transmission as primary BWP among active BWPs.

The BWP which has the same numerology as primary DL active BWPs among active BWPs may be used for PUCCH transmission, unless otherwise indicated.

In case of U-SCC, BWP used for PUCCH transmission in U-PCC may be used for PUCCH transmission in U-SCC.

Active BWP used for PUCCH transmission may be explicitly indicated. Active BWP may change over time, and the numerology used for PUCCH transmission may be configured semi-statically. That is, active BWP among BWPs with the same numerology may be changed over time. Further, the numerology used for PUCCH transmission may be explicitly indicated. The active BWP for the given numerology may be used for PUCCH transmission regardless of the number of active BWPs.

Regarding U-SCC, the following features may be considered. For U-SCC, a UE may be configured to perform RRM based on SS block and/or CSI-RS on U-SCC. If RRM measurement is done based on only CSI-RS, a UE may be configured with reference carrier, and a UE may utilize coarse time/frequency information obtained from the reference carrier's SS block. In other words, for RRM measurement and/or beam measurement CSI-RS and/or feedback CSI-RS configuration, a UE may be configured with quasi-collocated (QCL) SS block which is present in different U-SCC or different NR-carrier. In this case, a UE may be configured with U-PCC or U-SCC on the reference carrier. Unless U-SCC referring another carrier is deactivated, the referred carrier cannot be deactivated. When the intra-cell handover occurs, all carriers referring the same carrier for SS block may be handed over at the same time. Based on CSI-RS configurations and/or SS block corresponding to U-SCC, a UE may perform measurements. At configuration of U-SCC, a UE may be configured with one or more of BWPs, and active BWP(s) may be implicitly or explicitly determined similar to U-PCC case. In other words, configuration of BWPs may be done along with carrier configuration, whereas activation may be done automatically at carrier activation. Alternatively, U-SCC which belongs to the same NR carrier containing U-PCC or activated U-SCC or referred carrier may be automatically activated at configuration.

If U-SCC is configured for a NR SCell which also requires PRACH transmission for timing acquisition, similar procedure used in U-PCC for random access procedures may be applicable. In terms of PUCCH, if the carrier corresponds to a PUCCH cell in a cell group, similar handling to U-PCC may be applicable. Further, when U-SCC does not carry SS block, any BWP within U-SCC may be configured without containing SS block assuming that at least one BWP in referred carrier contains SS block. Accordingly, the measurement/tracking on SS block may be continued.

2. Semi-static configuration/reconfiguration

After configuration of one or more of U-CC, reconfiguration may be done as follows.

If the same BWP index is used for reconfigured BWPs, it may override previously configured BWPs. For active BWP(s), active BWP(s) may not be overridden. Or, if active BWP(s) are overridden, the overriding BWP(s) may be activated at configuration. Otherwise, any new or overriding BWPs may be deactivated at configuration. When active BWP(s) are overridden, to handle the ambiguity and fallback, the network may transmit a control signal to both set of active BWP(s), unless it is scheduled by cross-carrier scheduling.

If a new BWP index is used for reconfigured BWPs, a UE may assume that BWP is newly added.

A deactivation configuration may be also possible for a BWP to remove the BWP configuration.

3. Dynamic BWP switching

Based on semi-static configuration for measurement, active BWPs may be changed. Unless otherwise indicated, a UE may fallback to previous active BWP(s) after measurement (e.g. for RRM, beam management, CSI). Thus, if the network wants to change BWP, faster switching mechanism based on dynamic signaling may be considered in addition to reconfiguration of active BWP(s) via higher layer (i.e. RRC layer).

When faster BWP switching via dynamic signaling is considered, UL BWP switching may be triggered between PUSCH and PUCCH transmission or between PUSCH transmissions or between PUCCH transmissions or between UL channel and sounding reference signal (SRS).

In FDD, UL BWP may be independently activated/deactivated from DL BWP. In this case, the following features may be considered.

(1) UL BWP change may become effective at PUSCH transmission timing which is triggered by BWP switching DCI (if BWP switching occurs via UL grant). Earlier UL grant may not schedule any PUSCH transmission later than PUSCH scheduled by later UL grant. Any transmission earlier than the PUSCH transmission may follow previous active BWP(s) (for PUCCH, PUSCH, SRS). More particularly, SRS bandwidth may be configured separately, at least particularly for periodic SRS. At least one UL BWP may be configured to include the configured SRS configuration, and such UL BWP(s) may be active upon SRS transmissions. Thus, to schedule UL grant, or PUCCH resource on the timing where SRS transmission would occur, the following features may be considered.

PUSCH/PUCCH and SRS may not be transmitted simultaneously, and only time division multiplexing (TDM) may be supported so that UL BWP(s) may not be used for data transmission.

PUSCH/PUCCH may be transmitted simultaneously with SRS. In this case, the slot(s) containing SRS may be activated with the configured BWP(s). If multiple SRS configurations are possible, multiple BWP(s) may be activated for each SRS configuration pattern. Similarly, this may be applied to RRM-RS, beam management RS, and CSI-RS. In other words, if one or more of BWPs are activated to support reception/transmission of the configured RS configurations, it may be applied to both single and multiple configuration cases without loss of generality. This case (multiple configurations) may be handled as if there are multiple processes of each measurement. The similar concept may also be applied for aperiodic trigger of SRS/CSI/RRM/beam management measurement.

In terms of PRACH transmission, regardless of UL BWP, PRACH may be configured in anywhere in the NR carrier or U-CC. A UE may retune to transmit PRACH, if necessary, and sufficient gap for retuning may be created if needed.

(2) UL BWP change may become effective at UL BWP switching DCI reception, and some PUSCH transmission which cannot be transmitted due to different BWP may be dropped. For example, if UL BWP switching occurs from BWP1 to BWP2 and BPW1 and BPW2 are not overlapped with each other, any PUSCH scheduled on BPW1 may be dropped. In this case, PUCCH transmission may be autonomously changed for the newly activated BWP or PUCCH may also be dropped. For SRS, similar handling to (1) may be considered or SRS may also be dropped if different BWP(s) are assumed for SRS BWPs.

(3) UL BWP change may become effective at the first PUSCH transmission scheduled by UL grant after switching command. If a UE misses the first UL grant, it is possible that the network and UE may understand differently about active BWP which can cause PUSCH/PUCCH transmissions.

In TDD, UL BWP may be independently activated/deactivated from DL BWP. In this case, UL BWP and DL BWP may be changed within UE's RF bandwidth. UL and DL BWP may be activated/deactivated independently. Activation/deactivation timing may be same as FDD case. Or, if DL BWP are changed outside of UE's RF bandwidth, retuning on DL is necessary and UL BWP may also be changed simultaneously. In this case, a UE may assume that UL BWP is also automatically switched. In this case, UL BWP switching may occur at the same time where DL BWP switching occurs.

FIG. 11 shows a method for performing measurement based on SS blocks by a UE according to an embodiment of the present invention. The present invention described above may be applied to this embodiment.

In step S1100, the UE receives SMTC from a network. In step S1110, the UE performs measurement based on the SS blocks in a duration which is determined based on the SMTC. The SS blocks are included in an active bandwidth part (BWP).

The duration may be applied based on the active BWP. Or, the duration may be configured by a higher layer signaling from the network. Further, a frequency or bandwidth for the measurement may be configured by the network. Further, the active BWP may be activated during a time duration including at least a retuning gap for the active BWP, a measurement period and a retuning gap for another BWP.

The UE may operates at a current active BWP, before performing the measurement. The current active BWP may not include the SS blocks. The UE may perform fallback to the current active BWP, after performing the measurement.

FIG. 12 shows a wireless communication system to implement an embodiment of the present invention.

A UE 1200 includes a processor 1210, a memory 1220 and a transceiver 1230. The processor 1210 may be configured to implement proposed functions, procedures and/or methods described in this description. Layers of the radio interface protocol may be implemented in the processor 1210. The memory 1220 is operatively coupled with the processor 1210 and stores a variety of information to operate the processor 1210. The transceiver 1230 is operatively coupled with the processor 1210, and transmits and/or receives a radio signal.

A network node 1300 includes a processor 1310, a memory 1320 and a transceiver 1330. The processor 1310 may be configured to implement proposed functions, procedures and/or methods described in this description. Layers of the radio interface protocol may be implemented in the processor 1310. The memory 1320 is operatively coupled with the processor 1310 and stores a variety of information to operate the processor 1310. The transceiver 1330 is operatively coupled with the processor 1310, and transmits and/or receives a radio signal.

The processors 1210, 1310 may include application-specific integrated circuit (ASIC), other chipset, logic circuit and/or data processing device. The memories 1220, 1320 may include read-only memory (ROM), random access memory (RAM), flash memory, memory card, storage medium and/or other storage device. The transceivers 1230, 1330 may include baseband circuitry to process radio frequency signals. When the embodiments are implemented in software, the techniques described herein can be implemented with modules (e.g., procedures, functions, and so on) that perform the functions described herein. The modules can be stored in memories 1220, 1320 and executed by processors 1210, 1310. The memories 1220, 1320 can be implemented within the processors 1210, 1310 or external to the processors 1210, 1310 in which case those can be communicatively coupled to the processors 1210, 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method performed by a user equipment (UE) in a wireless communication system, the method comprising:
receiving, from a network, a configuration for a synchronization signal (SS) block measurement timing configuration (SMTC) duration, wherein the SMTC duration is a period of time in which one or more SS blocks are transmitted;
measuring the one or more SS blocks in the SMTC duration;
determining, among a plurality of bandwidth parts (BWPs), a BWP including the one or more SS blocks measured in the SMTC duration as an active BWP; and
performing a communication with the network in the active BWP.

2. The method of claim 1, wherein the SMTC duration is applied based on the active BWP.

3. The method of claim 1, wherein the SMTC duration is configured by a higher layer signaling from the network.

4. The method of claim 1, wherein a frequency or bandwidth for measuring the one or more SS blocks is configured by the network.

5. The method of claim 1, wherein the active BWP is activated during a time duration including at least a retuning gap for the active BWP, a measurement period and a retuning gap for another BWP.

6. The method of claim 1, further comprising operating at a current active BWP, before measuring the one or more SS blocks, and
wherein the current active BWP does not include the one or more SS blocks.

7. The method of claim 6, further comprising performing fallback to the current active BWP, after measuring the one or more SS blocks.

8. The method of claim 1, wherein the UE is in communication with at least one of a mobile device, a network, or autonomous vehicles other than the UE.

9. A user equipment (UE) configured to operate in a wireless communication system, the UE comprising:
a memory;
a transceiver; and
at least one processor, coupled to the memory and the transceiver, configured to:
receive, from a network, a configuration for a synchronization signal (SS) block measurement timing configuration (SMTC) duration, wherein the SMTC duration is a period of time in which one or more SS blocks are transmitted,
measure the one or more SS blocks in the SMTC duration,
determine, among a plurality of bandwidth parts (BWPs), a BWP including the one or more SS blocks measured in the SMTC duration as an active BWP, and
perform a communication with the network in the active BWP.

10. The UE of claim 9, wherein the SMTC duration is applied based on the active BWP.

11. The UE of claim 9, wherein the SMTC duration is configured by a higher layer signaling from the network.

12. The UE of claim 9, wherein a frequency or bandwidth for measuring the one or more SS blocks is configured by the network.

13. The UE of claim 9, wherein the active BWP is activated during a time duration including at least a retuning gap for the active BWP, a measurement period and a retuning gap for another BWP.

14. The UE of claim 9, wherein the at least one processor is further configured to operate at a current active BWP, before measuring the one or more SS blocks, and
wherein the current active BWP does not include the one or more SS blocks.

15. The UE of claim 14, wherein the at least one processor is further configured to perform fallback to the current active BWP, after measuring the one or more SS blocks.

* * * * *